United States Patent
Gritti et al.

(10) Patent No.: US 10,298,116 B2
(45) Date of Patent: May 21, 2019

(54) CONTROL UNIT OF A SWITCHING CONVERTER OPERATING IN DISCONTINUOUS-CONDUCTION AND PEAK-CURRENT-CONTROL MODE

(71) Applicant: STMicroelectronics S.r.l., Agrate Brianza (IT)

(72) Inventors: Giovanni Gritti, Bergamo (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/913,423

(22) Filed: Mar. 6, 2018

(65) Prior Publication Data
US 2018/0278151 A1    Sep. 27, 2018

(30) Foreign Application Priority Data
Mar. 21, 2017   (IT) .................. 102017000031162

(51) Int. Cl.
*H02M 1/42*    (2007.01)
*H02M 1/00*    (2006.01)
*H02M 3/156*   (2006.01)

(52) U.S. Cl.
CPC .......... *H02M 1/4225* (2013.01); *H02M 3/156* (2013.01); *H02M 2001/0025* (2013.01); *Y02B 70/126* (2013.01)

(58) Field of Classification Search
None
See application file for complete search history.

(56) References Cited

U.S. PATENT DOCUMENTS

| | | | |
|---|---|---|---|
| 8,536,849 B2* | 9/2013 | Wang ............... | H02M 3/156 323/284 |
| 9,692,297 B2* | 6/2017 | Archibald ......... | H02M 3/156 |
| 2006/0061337 A1 | 3/2006 | Kim et al. | |
| 2014/0369097 A1 | 12/2014 | Prescott et al. | |
| 2015/0117074 A1* | 4/2015 | Miao ............... | H02M 1/4225 363/44 |

FOREIGN PATENT DOCUMENTS

WO    2008/018095 A1    2/2008

* cited by examiner

*Primary Examiner* — Henry E Lee, III
(74) *Attorney, Agent, or Firm* — Seed IP Law Group LLP (57) ABSTRACT

A control unit for a switching converter has an inductor element coupled to an input and a switch element coupled to the inductor element. The control unit generates a command signal with a switching period to control the switching of the switch element and to determine a first time period where an inductor current is flowing in the inductor element for storing energy and a second time period where energy is transferred to a load. The second time period has an end portion where the inductor current drops to zero. The control unit determines the duration of the first time period based on a comparison between a sensing voltage, indicative of the peak value of the inductor current, and a reference voltage. A pre-distortion stage pre-distorts the reference voltage in order to compensate for a corresponding distortion on an input current of the converter compared to a desired sinusoidal characteristic.

18 Claims, 5 Drawing Sheets

CONTROL UNIT OF A SWITCHING CONVERTER OPERATING IN DISCONTINUOUS-CONDUCTION AND PEAK-CURRENT-CONTROL MODE

BACKGROUND

Technical Field

The present disclosure relates to a control unit of a switching converter, in particular (but not limited to) a power factor correction (PFC) converter. In particular, the control unit is a voltage converter operating in discontinuous conduction mode (DCM) and peak-current-control mode.

Description of the Related Art

In a known manner, voltage converters used in power supplies operating in switched mode (switched-mode power supplies, or SMPS), for example in desktop computers, LED lighting devices or electromedical devices, usually need to satisfy strict requirements regarding the related electrical performance.

In particular, such converters must guarantee a high quality factor, with a substantially unitary power factor (PF), for example greater than 0.9, and a total harmonic distortion (THD) of the input current that is ideally zero.

In general, such voltage converters are able to convert an input magnitude received, for example an alternating voltage (AC) coming from the electricity supply network into a regulated output magnitude, for example a direct voltage (DC), which is then used to supply an electrical load.

In particular, the use of power converters having a two-stage architecture, in which a first stage is a PFC converter, typically a boost or step-up PFC converter, is known, for example where a high output power is required. The present PFC converter performs a step-up operation on the network alternating voltage, generating a continuously regulated output voltage. The PFC converter is controlled by a suitable control unit or module ("controller") to regulate the power factor in the absorption of the electric line.

Figure 1:
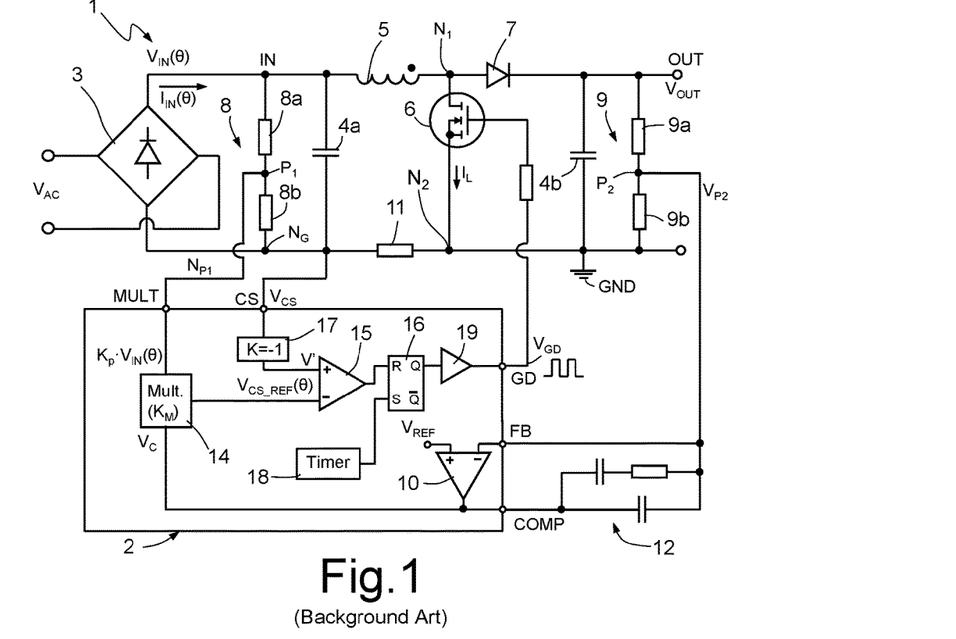
FIG. 1 is an outline circuit diagram of a voltage converter and a related control unit of a known type.

FIG. 1 shows the wiring diagram of a voltage converter, in particular a PFC boost converter, indicated as a whole using reference sign 1, controlled by a related control unit or module, indicated using reference sign 2.

The control unit 2 is an integrated circuit and has its own package and related input and output pins. This integrated circuit can be mounted on a single printed circuit board (PCB) with the circuit components, or the respective integrated circuit, which form the voltage converter 1.

In particular and in this configuration, the voltage converter 1 has an input terminal IN on which there is an input voltage $V_{IN}$ (with a rectified sine wave form) generated by a rectifier stage 3 (shown schematically), for example a diode-bridge rectifier, from an alternating voltage $V_{AC}$, for example supplied by the power supply network, and an output terminal OUT, on which there is a continuous output voltage $V_{OUT}$ that is greater than the input voltage $V_{IN}$ and regulated to a desired value.

The input voltage $V_{IN}$ can be considered to be substantially a rectified sinusoid, or $V_{IN}(\theta)=V_{IN,pk} \sin\theta$, where $\theta$, phase angle, is within the range $(0, \pi)$ and is given by $2\pi f_L t$ ($f_L$ being the frequency of the AC line).

A filter capacitor 4a performing high-frequency filtering functions is connected to the input terminal IN, while a storage capacitor 4b performing charge storage functions is connected to the output terminal OUT.

In particular, the filter capacitor 4a is also connected to a current return node $N_G$ (connected to the return node of the rectifier stage 3), while the storage capacitor 4b is also connected to a reference terminal or ground (gnd).

The voltage converter 1 includes an inductor element 5 connected between the input terminal IN and a first internal node $N_1$, a switch element 6, in particular a MOSFET power transistor, connected between the first internal node $N_1$ and a second internal node $N_2$, in this case connected to the reference terminal or ground (gnd), and a diode element 7 having an anode connected to the first internal node $N_1$ and a cathode connected to the output terminal OUT.

The switch element 6 has a first current conduction terminal, in particular the drain terminal of the respective MOSFET transistor, connected to the first internal node $N_1$, a second current conduction terminal, in particular the source terminal of the MOSFET transistor, connected to the second internal node $N_2$, and a control terminal, which is the gate terminal of the MOSFET transistor.

A first voltage divider 8 is connected between the input terminal IN and the current return node $N_G$, formed by a first divider resistor 8a connected in series with a second divider resistor 8b, forming a first divider node $P_1$, from which is drawn a first division voltage $V_{P1}$, equal to $K_p \cdot V_{IN}$, where $K_p$ is the division factor of the first voltage divider 8.

Furthermore, a second voltage divider 9 is connected between the output terminal OUT and the ground terminal gnd, formed by a respective first divider resistor 9a, connected in series to a respective second divider resistor 9b, forming a second division node $P_2$, from which is drawn a second division voltage $V_{P2}$.

The voltage converter 1 also includes a sensing resistor 11 between the second internal node $N_2$ (which is also the ground terminal gnd) and the current return node $N_G$, a voltage at the ends of or across the aforementioned sensing resistor 11 is indicative of a current $I_L$ flowing through the switch element 6 when closed, after passing through the inductor element 5. The aforementioned voltage is therefore given by $R_s \cdot I_L$, where Rs is the resistance of the sensing resistor 11.

The control unit 2 has an input (or pin) MULT designed to be connected to the first division node $P_1$ and to receive the first division voltage $V_{P1}$, an input COMP designed to be connected to the second division node $P_2$ via a compensation network 12 (of a known type, not described in detail here), an input FB connected to the same second division node $P_2$ and designed to receive the second division voltage $V_2$, an input CS on which there is a sensing voltage $V_{CS}$ (which is the same as the voltage at the ends of or across the sensing resistor 11), in this case designed to be coupled to the current return node $N_G$, and an output GD designed to be connected to the control terminal of the switch element 6 and to provide a command voltage $V_{GD}$ to command the switching of said switch element 6 using pulse width modulation (PWM) with appropriate timing.

The control unit 2 includes an error amplifier 10 having a first input connected to the input FB, receiving the second division voltage $V_{P2}$, a second input receiving a voltage reference $V_{REF}$, and an output on which same generates a comparison voltage $V_C$ as a function of the difference (or error) between the aforementioned division voltage $V_{P2}$ and the aforementioned voltage reference $V_{REF}$.

The control unit 2 also includes a multiplier stage 14 having a first multiplication input coupled to the input MULT, a second multiplication input coupled to the input COMP and designed to implement the product of the first division voltage $V_{P1}$ and the comparison voltage $V_C$, with a degree of multiplication $K_M$, to generate, at a multiplication output, a reference voltage, indicated with $V_{CS\_REF}$, given by the following expression:

$$V_{CS\_REF}(\theta) = V_C \cdot K_M \cdot K_P \cdot V_{in,pk} \cdot \sin\theta$$

The control unit 2 also includes a comparator stage 15 and a flip-flop or set/reset SR latch 16.

The comparator stage 15 has a first comparison terminal (for example positive), on which there is a comparison voltage V', a second comparison terminal (in the example, negative) connected to the multiplication output of the multiplier stage 14 and receiving the reference voltage $V_{CS\_REF}$, and an output that generates the reset signal for the SR latch 16.

In this case, the first comparison terminal is coupled to the input CS via a voltage level translator 17 configured to translate from negative to positive the sensing voltage $V_{CS}$ present at said input CS to generate the aforementioned comparison voltage V'.

The SR latch 16 therefore includes a reset input R connected to the output of the comparator stage 15, a set input S connected to a timer stage 18 that generates the set signal S on the basis of an appropriate determination of the duration of the off time period $T_{OFF}$, and an output Q that provides a command signal transformed by a drive unit (driver) 19 into the command voltage $V_{GD}$, at the output GD, to command the switching of the switch element 6.

In particular, the control unit 2 may be configured to control operation of the voltage converter 1 in discontinuous-conduction mode (DCM) with peak current control.

With each switching cycle, the control unit 2 commands the switch element 6 to close for an on time period $T_{ON}$ ('ON' period of the duty cycle), during which the current coming from the input terminal IN is flowing in the inductor element 5 and in the switch element 6 to ground, resulting in energy being stored in said inductor element 5.

In peak-current-control mode, the duration (or term) of the on time period $T_{ON}$ is stabilized by the control unit 2 using a suitable feedback control loop based on the voltage at the ends of or across the sensing resistor 11, indicative of the value of the inductor current $I_L$, which is compared with a suitable reference voltage (the reference voltage $V_{CS\_REF}$). This reference voltage $V_{CS\_REF}$, in turn determined as a function of the output voltage $V_{OUT}$, determines a desired current reference to be compared to the peak value of the aforementioned inductor current $I_L$.

The control unit 2 then commands the switch element 6 to open for an off time period $T_{OFF}$ ('OFF' period of the duty cycle), during which the energy previously stored in the inductor element 5 is transferred to the load and to the charge storage element 4b, via the diode element 7.

In particular, the duration of the off time period $T_{OFF}$ may be fixed (in a control mode referred to as fixed off time or FOT), or determined such that it is the PWM switching frequency that is fixed (in a control mode referred to as PWM fixed frequency or FF).

In any case, the discontinuous-conduction mode involves the inductor current $I_L$ dropping to zero during a portion of the switching period, in particular during an end portion $T_R$ of the off time period $T_{OFF}$ (unlike in continuous conduction mode, or CCM, which involves the inductor current $I_L$ not being zero and being greater than zero for the entire duration of the switching period).

In a manner obvious for a person skilled in the art, the discontinuous-conduction mode can occur in the presence of low-load conditions in the presence of CCM control. This is usually referred to as a DCM control mode, with the potential inclusion of this functionality being understood.

Figure 2:
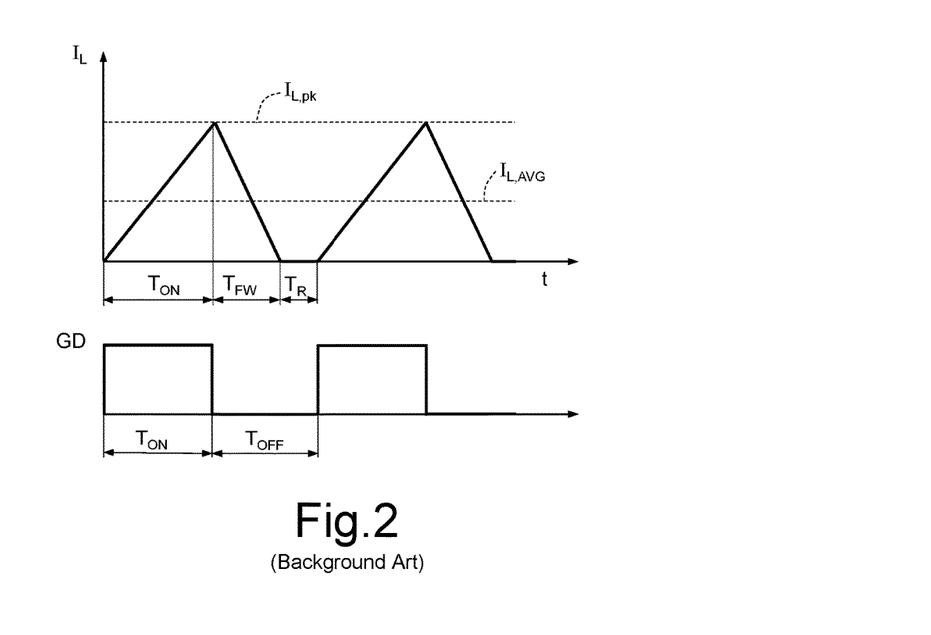
FIG. 2 is a signal diagram of electrical magnitudes related to the voltage converter in FIG. 1.

FIG. 2 shows the signal diagrams or trends, relating to the discontinuous-conduction mode described above, of the current $I_L$ in the inductor element 5 and of the command signal GD, showing the on time period $T_{ON}$, during which energy is stored in the inductor element 5, and the off time period $T_{OFF}$, comprising an initial portion $T_{FW}$ with a non-zero inductor current $I_L$ and an end portion $T_R$ with a zero inductor current $I_L$. FIG. 2 also shows $I_{L,pk}$, representing the peak value of the inductor current $I_L$ (determined, as indicated above, by the value of the reference voltage $V_{CS\_REF}$), and $I_{L,AVG}$, representing the average value of said inductor current $I_L$.

The operation of the control unit 2 therefore involves the output Q of the SR latch 16 becoming periodically low, determining the end of the on time period $T_{ON}$ and the beginning of the off time period $T_{OFF}$, when the comparison voltage V', a function of the peak value $I_{L,pk}$ of the inductor current $I_L$, has a predetermined ratio to the reference voltage $V_{CS\_REF}$, making the reset signal for the reset input R high (in other words, the peak value $I_{L,pk}$ of the inductor current $I_L$ is determined by the current reference provided by the value of the reference voltage $V_{CS\_REF}$). The output Q becomes high, determining the end of the off time period $T_{OFF}$ and the new beginning of the on time period $T_{ON}$, when the timer stage 18 switches the set signal for the set input S of said SR latch 16, on the basis of the determination of the desired duration of the off time period $T_{OFF}$.

As can be easily demonstrated, the peak value of the inductor current $I_L$ (at the end of the on time period $T_{ON}$) is given by:

$$I_{L,pk}(\theta) = \frac{V_{CS\_REF}(\theta)}{R_S} = \frac{V_C \cdot K_M \cdot K_P \cdot V_{in,pk} \cdot \sin\theta}{R_S} = I_{LPK}\sin\theta$$

This peak value therefore has a sinusoidal characteristic or trend in that, during use and in consideration of the sufficiently narrow band of the compensation network 12, for example less than 20 Hz, the comparison voltage $V_C$ can be considered to be substantially constant (or a continuous value) in a line cycle.

The input current $I_{IN}$, that is absorbed by the power supply network, which is the same as the average value of the inductor current $I_L$ in the switching period, is equal to:

$$I_{IN}(\theta) = \frac{1}{2} \cdot I_{L,pk}(\theta) \frac{T_{ON}(\theta) + T_{FW}(\theta)}{T_{ON}(\theta) + T_{FW}(\theta) + T_R(\theta)} = \frac{1}{2} \cdot I_{LPK}\sin\theta \cdot \frac{T_{SW}(\theta) - T_R(\theta)}{T_{SW}(\theta)}$$

where $T_{SW}$ indicates the total duration of the switching period.

The above expression clearly shows that the trend in the input current $I_{IN}(\theta)$ is not sinusoidal, thereby determining a power factor PF<1 and a distortion factor THD>0%, which is not desirable. In particular, the values of the aforementioned power factor PF and of the aforementioned distortion factor THD may depart significantly from ideal values under certain operating conditions of the voltage converter 1, when increasing the duration of the end portion $T_R$ of the off time period $T_{OFF}$.

The known solutions that provide for control based on the peak current in discontinuous-conduction mode are therefore not entirely satisfactory.

Although there are other control solutions, for example based on controlling the mean current, these solutions are more complex to implement and also typically require an additional pin in the control unit 2 to compensate the current loop.

In other words, existing control solutions necessarily require a compromise between distortion characteristics, complexity and implementation cost.

BRIEF SUMMARY

The purpose of the present disclosure is to address the problems set out above, and in particular to provide a control solution that enables improved performance of a control solution based on peak current in a converter (in particular a PFC boost converter) operating in discontinuous-conduction mode.

The present disclosure therefore provides such a control unit for a switching converter and the corresponding switching converter.

BRIEF DESCRIPTION OF THE SEVERAL VIEWS OF THE DRAWINGS

The present disclosure is further described below with reference to preferred embodiments of same, which are provided purely as non-limiting examples, and to the attached drawings, in which.

DETAILED DESCRIPTION

Figure 3:
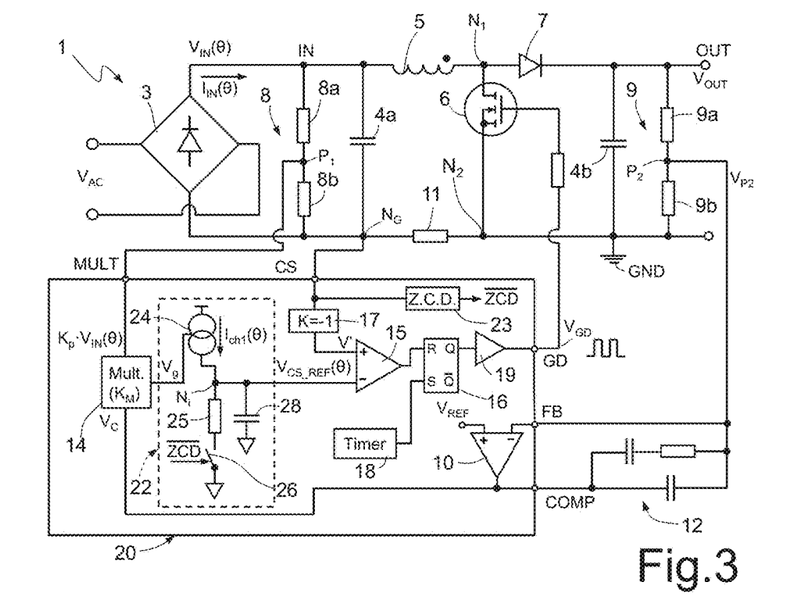
FIG. 3 is a block diagram of a switching converter and a related control unit according to one embodiment of the present solution.

FIG. 3 shows a control unit, indicated as a whole using reference sign 20, for controlling a switching converter 1, in particular a voltage converter, and more particularly a PFC boost converter operating in discontinuous-conduction and peak-current-control mode.

In FIG. 3, by way of example, the voltage converter is entirely similar to the voltage converter 1 in FIG. 1 (similar elements are therefore illustrated using the same reference numbers, and are not described again).

The control unit 20 is in turn constructed in a substantially similar manner to the control unit 2 in FIG. 1 (similar elements are therefore illustrated using the same reference numbers, and are not discussed again), but differs in that it additionally includes a pre-distortion stage 22.

As will be discussed in detail below, this pre-distortion stage 22 is configured to appropriately distort the value of the reference voltage $V_{CS\_REF}$, such as to compensate for the distortion of the value of the input current $I_{IN}$ caused by the switching operation of the switching converter.

In particular and as indicated above, the input current is distorted by a distortion factor given by the following expression:

$$D = \frac{T_{SW}(\theta) - T_R(\theta)}{T_{SW}(\theta)}$$

The pre-distortion stage 22 therefore acts such that the reference voltage $V_{CS\_REF}$ (and therefore the peak value $I_{LPK}$ of the inductor current $I_L$, determined by said reference voltage $V_{CS\_REF}$) is pre-distorted by a pre-distortion factor D' given by the following expression:

$$D' = \frac{T_{SW}(\theta)}{T_{SW}(\theta) - T_R(\theta)}$$

In other words, the pre-distortion factor D' is equal to the inverse of the distortion factor D. This intervention by the pre-distortion stage 22 ensures that the input current $I_{IN}$ is ideally sinusoidal, as desired, enabling the performance of the voltage converter 1 to be optimized.

In the embodiment shown in FIG. 3, the pre-distortion stage 22 is connected between the multiplication output of the multiplier stage 14 and the second comparison terminal of the comparator stage 15, to which same supplies the reference voltage $V_{CS\_REF}$, which has been appropriately pre-distorted.

The pre-distortion stage 22 therefore has a first input that in this case receives the product voltage $V_g$ supplied by the multiplier stage 14 at the multiplication output, given by: $V_g(\theta) = V_C \cdot K_M \cdot K_P \cdot V_{in,pk} \cdot \sin\theta$, a second input that receives the negated version $\overline{ZCD}$ of a zero current detection (ZCD) signal from a suitable detection stage 23, this ZCD signal being indicative of a zero condition of inductor current $I_L$ and therefore of the occurrence of the end portion $T_R$ of the off time period $T_{OFF}$, and an output that provides the reference voltage $V_{CS\_REF}$ to the aforementioned second comparison terminal of the comparator stage 15.

In a known manner not described in detail here, the detection stage 23 is coupled to the input CS of the control unit 20 such as to receive the detection voltage $V_{CS}$, and is configured such as to generate the ZCD signal as a function of said detection voltage $V_{CS}$.

In greater detail and as illustrated in FIG. 3, the pre-distortion stage 22, in a possible embodiment, includes a current source 24 that is voltage controlled by a control voltage, which is in this case the same as the product voltage $V_g$ supplied by the multiplier stage 14 and designed to generate a charging current $I_{ch1}$ as a function of said command voltage on an internal node $N_i$, a resistor element 25 having a resistance $R_{r1}$ being connected to said internal node $N_i$ and to the reference terminal or ground (gnd) via a switch element 26, and a capacitor element 28 having a capacity or capacitance value $C_{t1}$, connected between said internal node $N_i$ and the ground terminal gnd.

In particular, the switch element 26 is commanded to switch by the aforementioned negated version $\overline{ZCD}$ of the ZCD signal.

In use, the capacitor element 28 is in particular charged during the end portion $T_R$ of the off time period $T_{OFF}$ (or when the inductor element 5 is entirely demagnetized), when the signal $\overline{ZCD}$ is low (logic '0') and the switch element 26 is open, with a charging current $I_{ch1}$ supplied by the current source 24 that is proportional to the product voltage $V_g$.

The same capacitor element 28 is discharged via the resistor element 25 during the remainder of the switching period $T_{SW}$ (of duration $T_{SW}$-$T_R$), or, when the inductor element 5 is magnetized, the signal ZCD being high (logic '1') and the switch element 26 being closed. During the same time period ($T_{SW}$-$T_R$), the current source 24 continues to supply the charging current $I_{ch1}$ to the capacitor element 28.

If the charging constant $R_{t1} \cdot C_{t1}$ of the aforementioned capacitor element satisfies the following expression:

$$T_{SW}(\theta) << R_{t1} \cdot C_{t1} << \frac{1}{f_L}$$

application of the principle of charge balancing on the capacitor element 28 provides the following equation:

$$I_{ch1}(\theta) \cdot T_{SW}(\theta) = \frac{V_{CS\_REF}(\theta)}{R_{t1}} \cdot [T_{SW}(\theta) - T_R(\theta)]$$

resulting in:

$$V_{CS\_REF}(\theta) = R_{t1} \cdot I_{ch1}(\theta) \cdot \frac{T_{SW}(\theta)}{T_{SW}(\theta) - T_R(\theta)}$$

Bearing in mind that the charging current $I_{ch1}$ is given by:

$$I_{ch1}(\theta) = g_{m1} \cdot V_g(\theta)$$

where $g_{m1}$ is the transconductance of the current source 24, and replacing the expression previously cited for the product voltage $V_g$, the aforementioned expression can be rewritten as follows:

$$V_{CS\_REF}(\theta) = g_{m1} \cdot R_{t1} \cdot V_C \cdot K_M \cdot K_P \cdot V_{in,pk} \sin\theta \cdot \frac{T_{SW}(\theta)}{T_{SW}(\theta) - T_R(\theta)}$$

or: $V_{CS\_REF}(\theta) = g_{m1} \cdot R_{t1} \cdot V_C \cdot K_M \cdot K_P \cdot V_{in,pk} \sin\theta \cdot D'$ Using this expression and remembering that:

$$I_{IN}(\theta) = \frac{1}{2} \frac{V_{CS\_REF}(\theta)}{R_S} \sin\theta \cdot \frac{T_{SW}(\theta) - T_R(\theta)}{T_{SW}(\theta)} = \frac{1}{2} \frac{V_{CS\_REF}(\theta)}{R_S} \sin\theta \cdot D$$

given that D·D'=1, the input current $I_{IN}$ is given by:

$$I_{IN}(\theta) = \frac{1}{2R_S} V_C \cdot g_{m1} \cdot R_{t1} \cdot K_M \cdot K_P \cdot V_{in,pk} \sin\theta$$

being therefore sinusoidal and in phase with the input voltage $V_{IN}(\theta)$, assuming that the comparison voltage $V_C$ is constant in the line semi-period (this being the case in all cases with standard PFC converters).

The voltage converter 1 therefore ideally has a unitary power factor PF (PF=1) and a distortion factor THD that is substantially zero (THD=0), in particular regardless of the duration of the end portion $T_R$ of the off time period $T_{OFF}$.

Furthermore and advantageously, if said end portion $T_R$ of the off time period $T_{OFF}$ has a zero duration (or, in the case of operation in continuous conduction mode of the voltage converter 1), the pre-distortion stage 22 acts as a simple gain stage (with a gain factor of $g_{m1} \cdot R_{t1}$), without thereby altering operation of the control solution adopted.

Figure 4A:
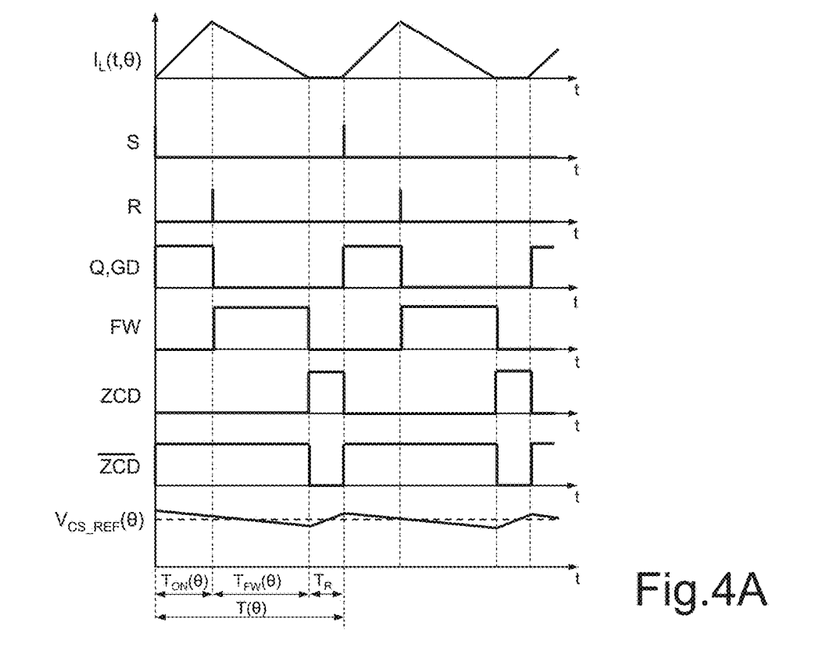
FIGS. 4A and 4B are signal diagrams of electrical magnitudes relating to the operation of the control unit in FIG. 3.
Figure 4B:
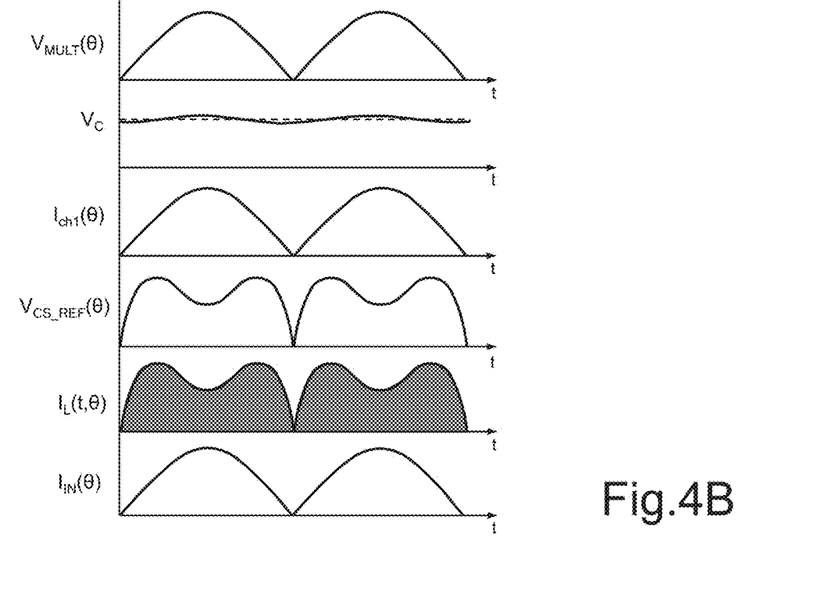

The foregoing is further clarified in FIGS. 4A and 4B, which show the signal diagrams or trends of the signals and, respectively, of the most significant waveforms relating to operation of the control unit 20 described above. The signal FW in FIG. 4A represents the time $T_{FW}$, namely the initial portion of the off time period $T_{OFF}$.

Figure 5:
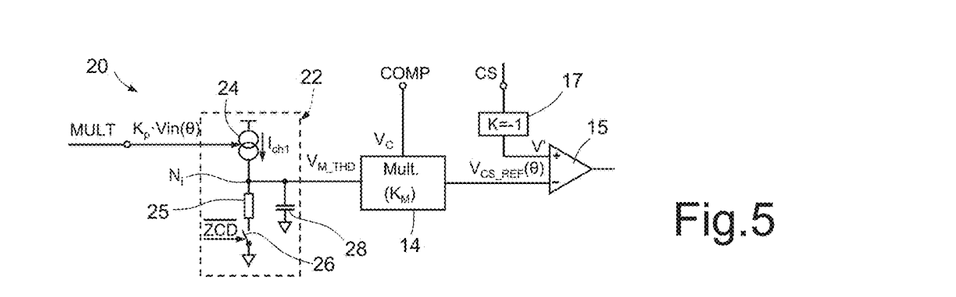
FIGS. 5 and 6 show additional embodiments relating to the use of a stage of the control unit of the switching converter.

A variant embodiment of the control unit, again indicated using reference sign 20, is described below with reference to FIG. 5, showing only the related portion of said variant for the sake of simplicity (the rest of the control unit 20 is understood to be similar to that shown in relation to FIG. 3).

This embodiment differs from the solution described above in that the pre-distortion stage 22 is in this case connected between the input MULT of the control unit 20 and the first multiplication input of the multiplier stage 14.

The current source 24 is then controlled by the voltage at said input MULT, given by: $V_{MULT}(\theta) = K_P \cdot V_{in,pk} \sin\theta$ Applying considerations entirely similar to those applied previously to the embodiment in FIG. 3, it is immediately clear that the voltage supplied by the pre-distortion stage 22 to the aforementioned first multiplication input of the multiplier stage 14, indicated by $V_{M\_THD}$, is given by:

$$V_{M\_THD}(\theta) = V_{MULT}(\theta) \cdot g_{m1} \cdot R_{t1} \cdot \frac{T_{SW}(\theta)}{T_{SW}(\theta) - T_R(\theta)}$$

Again in this case, the reference voltage $V_{CS\_REF}$ at the multiplication output of the multiplier stage 14 is distorted by the pre-distortion factor D':

$$V_{CS\_REF}(\theta) = (g_{m1} \cdot R_{t1} \cdot V_C \cdot K_M \cdot K_P \cdot V_{in,pk} \sin\theta) \cdot D'$$

As a result, the input current $I_{IN}(\theta)$ is again sinusoidal and in phase with the input voltage $V_{IN}(\theta)$.

Figure 6:
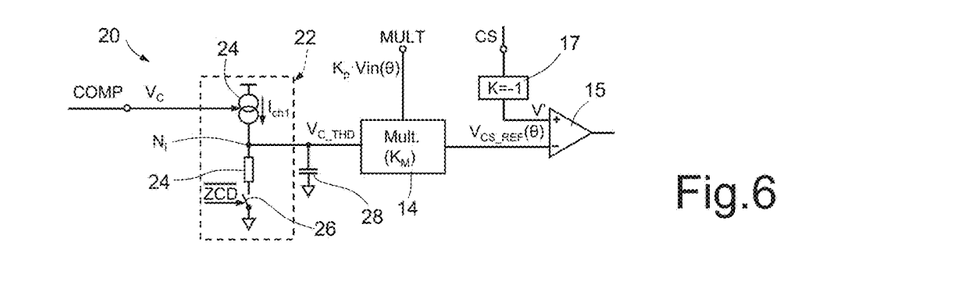

FIG. 6 shows a different embodiment of the control unit 20 (again, only a portion of which is shown, for the sake of simplicity).

This embodiment differs from the solution described above in that the pre-distortion stage 22 is in this case connected between the input COMP of the control unit 20 and the second multiplication input of the multiplier stage 14.

The current source 24 is then controlled by the comparison voltage $V_C$ at said input COMP.

Applying considerations entirely similar to those applied to the preceding embodiments, it is immediately clear that the voltage supplied by the pre-distortion stage 22 to the second multiplication input of the multiplier stage 14, indicated as $V_{C\_THD}$, is given by:

$$V_{C\_THD}(\theta) = V_C \cdot g_{m1} \cdot R_{t1} \cdot \frac{T_{SW}(\theta)}{T_{SW}(\theta) - T_R(\theta)}$$

Again in this case, the reference voltage $V_{CS\_REF}$ at the multiplication output of the multiplier stage 14 is distorted by the pre-distortion factor D', according to the expression previously cited on multiple occasions:

$$V_{CS\_REF}(\theta)=(g_{m1} \cdot R_{t1} \cdot V_C \cdot K_M \cdot K_P \cdot V_{in,pk} \cdot \sin\theta) \cdot D'$$

In this case, the input current $I_{IN}(\theta)$ is again sinusoidal and in phase with the input voltage $V_{IN}(\theta)$.

The advantages of the solution proposed are clear from the above description.

In any case, it should again be noted that such a solution makes it possible to overcome the limitations of the control solutions of a known type, making it possible, inter alia, to obtain an input current $I_{IN}$ that is ideally sinusoidal and a distortion factor that is ideally zero (and in any case less than 10%) in a control solution based on the peak current in a voltage converter (in particular a PFC boost converter) operating in discontinuous-conduction mode (DCM).

The applicant has tested and checked the solution proposed using numerous experimental tests and simulations.

Figure 7:
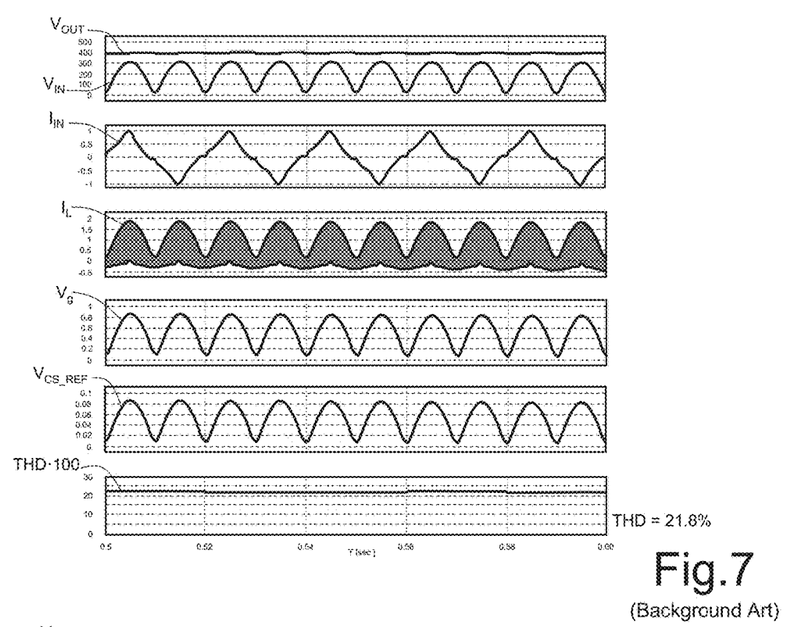
FIGS. 7 and 8 are signal diagrams of electrical magnitudes of the control unit of a known type (FIG. 7) and in the control unit according to the present solution (FIG. 8), respectively.
Figure 8:
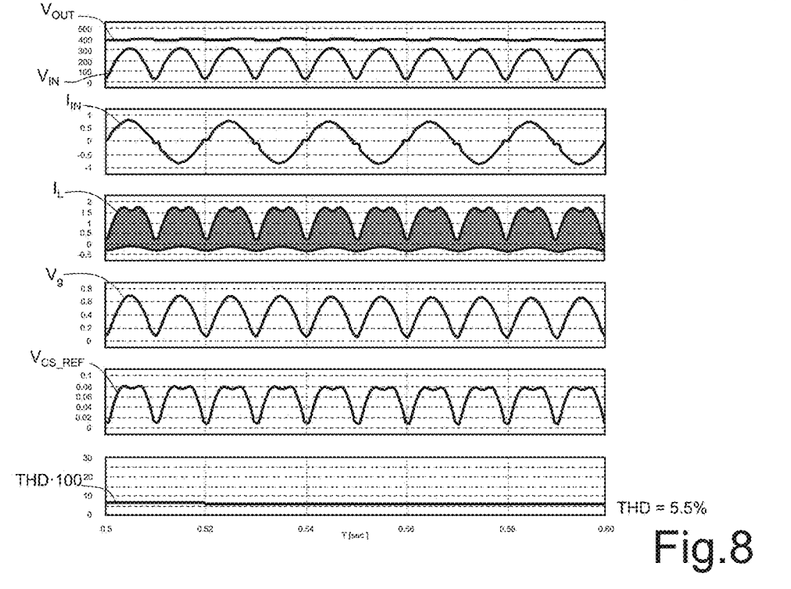

By way of example, FIGS. 7 and 8 compare the performance of a control unit according to the prior art (in particular, the control unit 2 in FIG. 1), shown in FIG. 7), and the performance of the control unit 20 according to the present solution, shown in FIG. 8.

In both cases, the voltage converter works in discontinuous-conduction mode (DCM) (with a load equal to 33% of the nominal load), with an input alternating voltage $V_{AC}$ of 230 V.

It can be seen immediately that the solution proposed makes it possible to significantly reduce the distortion of the waveform, achieving a substantial reduction in the distortion factor THD, from around 22% (in the traditional solution) to less than 6% (in the proposed solution).

Although not illustrated, the applicant has verified the possibility of obtaining, with the same input alternating voltage $V_{AC}$ of 230 V, a distortion factor of 8.5%, if the load is equal to 20% of the nominal load.

Figure 9:
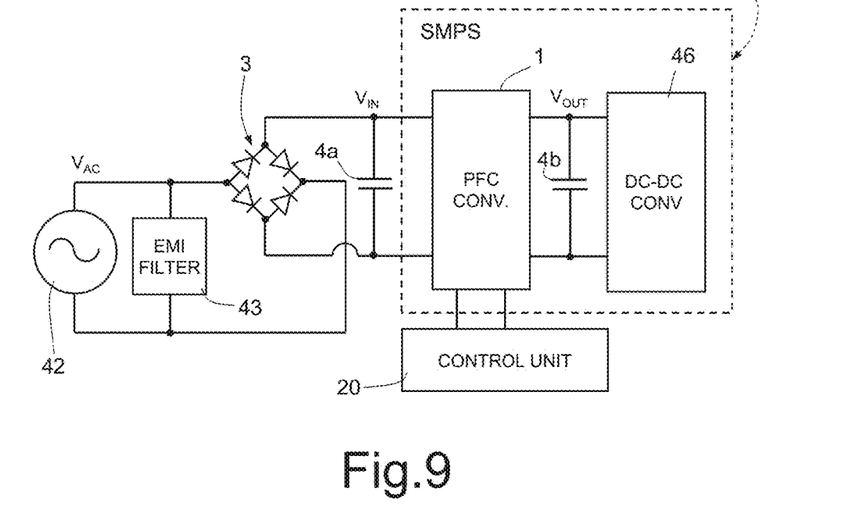
FIG. 9 is an outline block diagram of an electronic device using the switching converter of FIG. 3.

As indicated above, the voltage converter 1 and the related control unit 20 may advantageously be used in a switched power supply 40, as shown in FIG. 9.

In particular, the switched power supply 40 includes the rectifier stage 3 (for example a diode-bridge rectifier) connected to the electricity network 42, in this example via an EMI filter 43, and the input capacitor element 4a, connected to the output of the rectifier stage 3, on which there is the input voltage $V_{IN}$.

The switched power supply 40 also includes the voltage converter 1, having an input terminal IN connected to the input capacitor element 4a and an output terminal OUT connected to the charge storage element 4b, as defined above.

The control unit 20 controls operation of the voltage converter 1, such as to ensure a desired power factor in the absorption of the electrical network 42.

The switched power supply 40 also includes an output power converter 46, for example a DC/DC converter, having an input connected to the output capacitor element 4b that is designed to provide a load or end user (not shown) with a desired output voltage value, for example a value appropriately reduced in relation to the value of the output voltage $V_{OUT}$.

It is evident that modifications and variations may be made to the subject matter described and illustrated without thereby moving outside the scope of protection of the present disclosure, as defined in the attached claims.

Figure 10:
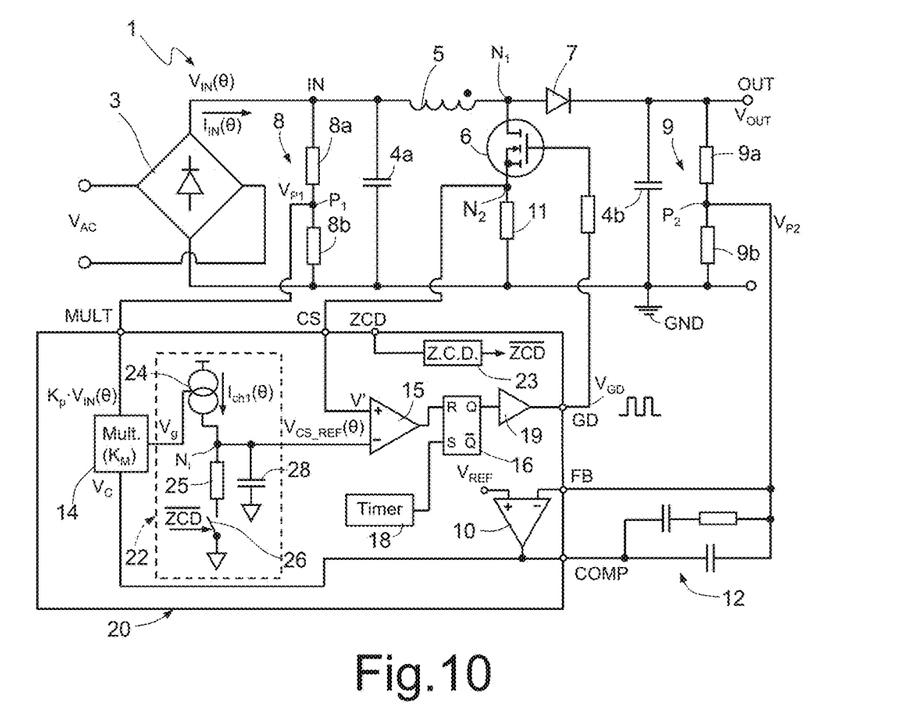
FIG. 10 is a block diagram of a switching converter and a related control unit according to another embodiment of the present solution.

In particular and as shown in FIG. 10, a variant embodiment of the voltage converter 1 may provide for the sensing resistor 11 to be connected between the second internal node $N_2$ and the reference terminal or ground (gnd).

In this case, the input CS of the control unit 20 is connected directly to said second internal node $N_2$, and said control unit 20 does not provide for the presence of the voltage translator 17, there being no need for the negative-to-positive translation of the sensing voltage $V_{CS}$ at said input CS to generate the comparison voltage V'.

Furthermore and in this case, the control unit 20 provides an input ZCD designed to receive a suitable signal to detect the zero-current condition (in a known manner, and not described in detail here).

No other changes are made to the pre-distortion stage 22, which therefore operates as described in detail above.

It should be noted that the voltage converter 1 may be powered by a power source other than the electricity network.

Furthermore, the switching converter to which the present solution relates may advantageously form a voltage converter or regulator, as referred to in the text above, by way of non-limiting example, or a current converter or regulator (such as drive devices, drivers, for LEDs or battery chargers).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control unit for controlling a switching converter including at least one inductor element coupled at an input configured to receive an input voltage and a switch element coupled to said inductor element, the control unit being configured to generate a command signal having a switching period to control the switching of the switch element to generate an output voltage, and the control unit further configured to determine, in said switching period, a first time period in which an inductor current is flowing in said inductor element to store energy and a second time period in which energy is transferred to a load, said second time period having an end portion in which the inductor current drops to zero, said control unit configured to determine the duration of said first time period based on a comparison between a voltage indicative of a peak value of the inductor current and a reference voltage, the control unit including a pre-distortion stage configured to pre-distort said reference voltage to compensate for a corresponding distortion on an input current of said converter in relation to a desired sinusoidal trend of the input current caused by switching operation of the switching converter, said pre-distortion stage configured to pre-distort said reference voltage by a pre-distortion factor given by the following expression:

$$D' = \frac{T_{SW}(\theta)}{T_{SW}(\theta) - T_R(\theta)}$$

where $T_{SW}(\theta)$ represents said switching period and $T_R(\theta)$ represents said end portion of said second time period.

2. The control unit according to claim 1, wherein the control unit further comprises:

a first input configured to receive a division of said input voltage;

a second input;

an error amplifier configured to generate a comparison voltage on the second input as a difference between a division of the output voltage of said switching converter and a voltage reference;

a comparator stage having a first comparison terminal configured to receive said voltage indicative of the peak value of the inductor current and a second comparison terminal configured to receive said reference voltage; and a multiplier stage having a first multiplication input coupled to said first input of said control unit, a second multiplication input coupled to said second input of said control unit, and a multiplication output coupled to said second comparison terminal of said comparator stage.

3. The control unit according to claim 2, wherein said predistortion stage has a respective input connected to the multiplication output of said multiplier stage and a respective output connected to the second comparison terminal of said comparator stage.

4. The control unit according to claim 2, wherein said predistortion stage has a respective input connected to said first input of said control unit and a respective output connected to the first multiplication input of said multiplier stage.

5. The control unit according to claim 2, wherein said predistortion stage has a respective input connected to said second input of said control unit and a respective output connected to the second multiplication input of said multiplier stage.

6. The control unit according to claim 1, wherein said predistortion stage further comprises:

a first input;

a current source controlled by a voltage present on said first input of said predistortion stage to output a charging current;

a resistor element connected to said current source and to a reference ground terminal via a switch element; and a capacitor element connected to said current source and to said reference ground terminal, said switch element configured to open and close in response to a command signal indicative of a zero condition of said inductor current.

7. The control unit according to claim 6, wherein, said capacitor element discharges through said resistor element during said switching period except during said end portion of said second time period during which said capacitor element is charged by said charging current.

8. The control unit according to claim 7, further comprising a detection stage configured to generate a zero current detection signal indicating the said end portion of said second time period wherein said inductor current is zero, and wherein said command signal is a negated version of the zero current detection signal.

9. The control unit according to claim 2, further comprising:

a set/reset latch SR having a reset input connected to the output of the comparator stage a set input and an output that supplies a command signal;

a timer stage coupled to the set input of the set/reset latch SR that generates the set signal based on a determination of the duration of the second time period; and a drive unit coupled to the output of the set/reset latch SR and configured to transform the command signal into a command voltage configured to control switching of the switch element.

10. An electrical apparatus, comprising:

a switching converter including at least one inductor element coupled to an input node configured to receive an input voltage and a switch element coupled to the inductor element, the switch element including a control node configured to receive a command signal that controls switching of the switch element to generate an output voltage on an output node; and a control unit configured to generate the command signal having a switching period to control the switching of the switch element, and the control unit further configured to determine, in the switching period, a first time period in which an inductor current is flowing in the inductor element to store energy and a second time period in which energy is transferred to a load, said second time period having an end portion in which the inductor current drops to zero, the control unit configured to determine the duration of the first time period based on a comparison between a voltage indicative of a peak value of the inductor current and a reference voltage, the control unit including a pre-distortion stage configured to pre-distort the reference voltage to compensate for a corresponding distortion on an input current of the converter in relation to a desired sinusoidal trend of the input current caused by switching operation of the switching converter, wherein said pre-distortion stage includes:

a first input;

a current source controlled by a voltage present on said first input of said pre-distortion stage to output a charging current;

a resistor element connected to said current source and to a reference ground terminal via a switch element; and a capacitor element connected to said current source and to said reference ground terminal, said switch element configured to open and close in response to a command signal indicative of a zero condition of said inductor current.

11. The electrical apparatus of claim 10, wherein the switching converter comprises a boost converter configured to operate in a discontinuous-conduction and peak-current-control mode.

12. The electrical apparatus of claim 11, wherein the boost converter is further configured to operate in a continuous-conduction and peak-current-control mode, and wherein the pre-distortion stage is configured to receive a product voltage based on the input voltage and a comparison voltage indicating a difference between the output voltage a second reference voltage, and wherein the pre-distortion stage is configured to apply a gain to the product voltage to generate the reference voltage in the continuous-conduction and peak-current-control mode.

13. The electrical apparatus according to claim 12, further comprising:

an input stage including said switching converter coupled to a power source configured to supply the input voltage; and an output stage configured to supply a regulated magnitude to a load as a function of the output voltage, the control unit configured to control a power factor correction in the power absorption of the power source.

14. The electrical apparatus of claim 10, wherein the switch element comprises a transistor.

15. A method, comprising:
generating a command signal having a switching period to control the switching of a switch element of a switching converter to generate an output voltage, the switch element being coupled to at least one inductor element configured to receive an input voltage;
determining a first time period of the switching period during which an inductor current flows in said inductor element to store energy in the inductor element;
determining a second time period of the switching period during which energy is transferred to a load, the second time period having an end portion in which the inductor current drops to zero;
determining a duration of said first time period on the basis of a comparison between a voltage indicative of a peak value of the inductor current and a reference voltage;
pre-distorting said reference voltage during the first time period and the second time period to compensate for a corresponding distortion of said input current from a desired sinusoidal characteristic; and
wherein the input current is distorted from the desired sinusoidal characteristic by a distortion factor, and wherein pre-distorting said reference voltage includes multiplying the reference voltage by the inverse of the distortion factor.

16. The method of claim 15, wherein generating the command signal comprises pulse width modulating the command signal.

17. The method of claim 15, wherein pre-distorting said reference voltage comprises:
discharging a capacitive element at a first rate during said switching period except during said end portion of said second time period to generate the reference voltage across the capacitive element; and
charging the capacitive element at a second rate during the end portion of the second time period to generate the reference voltage across the capacitive element.

18. The method of claim 15, further comprising generating said reference voltage based on the input voltage and a difference between the output voltage and an output reference voltage.

* * * * *